United States Patent
Xu et al.

(10) Patent No.: US 7,200,398 B1
(45) Date of Patent: Apr. 3, 2007

(54) SYSTEM AND METHOD FOR HANDOVER EXECUTION IN A WIRELESS ENVIRONMENT

(75) Inventors: Xiaode Xu, Fremont, CA (US); Wenfeng Huang, San Ramon, CA (US); Howard S. Pines, El Cerrito, CA (US); Ian Sayers, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 11/012,405

(22) Filed: Dec. 14, 2004

Related U.S. Application Data

(63) Continuation of application No. 09/972,406, filed on Oct. 5, 2001, now Pat. No. 6,862,082.

(51) Int. Cl.
*H04Q 7/00* (2006.01)

(52) U.S. Cl. .................. 455/436; 455/438; 455/439; 370/331

(58) Field of Classification Search ............ 455/428, 455/445–446, 432.1, 433, 436–439; 370/330–334, 370/46
See application file for complete search history.

(56) References Cited

U.S. PATENT DOCUMENTS

| | | | |
|---|---|---|---|
| 5,530,693 A | 6/1996 | Averbuch et al. | 370/60 |
| 5,875,185 A | 2/1999 | Wang et al. | 370/331 |
| 5,974,036 A | 10/1999 | Acharya et al. | 370/331 |
| 6,009,326 A | 12/1999 | Roder et al. | 455/436 |
| 6,128,287 A | 10/2000 | Freeburg et al. | 455/436 |
| 6,246,672 B1 * | 6/2001 | Lumelsky | 370/310 |
| 6,256,492 B1 | 7/2001 | Bilgic | 455/418 |
| 6,289,008 B1 | 9/2001 | Sakamoto et al. | 455/436 |
| 6,301,479 B1 | 10/2001 | Roobol et al. | 455/436 |
| 6,351,460 B1 | 2/2002 | Tiedemann et al. | 455/442 |
| 6,370,392 B1 | 4/2002 | Li et al. | 455/436 |
| 6,473,411 B1 | 10/2002 | Kumaki et al. | 455/436 |
| 6,473,442 B1 | 10/2002 | Lundsjo et al. | 455/450 |
| 6,584,325 B1 | 6/2003 | Shakhgildian | 455/525 |
| 6,587,680 B1 | 7/2003 | Ala-Laurila et al. | 455/436 |
| 6,590,879 B1 | 7/2003 | Huang et al. | 455/436 |
| 6,625,154 B1 | 9/2003 | Murata | 370/395 |
| 6,628,943 B1 | 9/2003 | Agrawal et al. | 455/432.1 |
| 6,631,122 B1 * | 10/2003 | Arunachalam et al. | 370/332 |
| 6,690,659 B1 | 2/2004 | Ahmed et al. | 370/328 |
| 6,721,291 B1 | 4/2004 | Bergenwall et al. | 370/331 |
| 6,738,812 B1 | 5/2004 | Hara et al. | 709/224 |
| 6,968,192 B2 * | 11/2005 | Longoni | 455/453 |
| 6,993,359 B1 * | 1/2006 | Nelakanti et al. | 455/554.1 |

\* cited by examiner

*Primary Examiner*—Congvan Tran
(74) *Attorney, Agent, or Firm*—Baker Botts L.L.P.

(57) ABSTRACT

A method for handover execution in a wireless environment is provided that comprises communicating, by a mobile network, a handover command message to a physical layer of a mobile station to initiate a handover execution. The handover command message is received by the physical layer, which responds by tuning to a handed to frequency and by communicating physical layer bursts over the handed to frequency such that initial timing advance and power control setting characteristics are determined by the mobile network. The method also includes communicating a cease signal to stop communicating the bursts to the mobile station, which responds by ending the transmission of the bursts and by establishing a new communications link over the handed to frequency with the mobile network. The mobile station and mobile network may then couple to a voice or data path such that a wireless communication associated with the mobile station and the mobile network is facilitated.

18 Claims, 2 Drawing Sheets

SYSTEM AND METHOD FOR HANDOVER EXECUTION IN A WIRELESS ENVIRONMENT

CROSS REFERENCE TO RELATED APPLICATIONS

This application is a continuation of U.S. application Ser. No. 09/972,406, filed Oct. 5, 2001 now U.S. Pat. No. 6,862,082 by Xiaode Xu, et al. and entitled "System and Method for Handover Execution in a Wireless Environment."

TECHNICAL FIELD OF THE INVENTION

This invention relates in general to the field of wireless communications, and more particularly to a system and method for handover execution in a wireless environment.

BACKGROUND OF THE INVENTION

The field of wireless communications has become increasingly important in today's society. One area associated with wireless communications relates to a handoff or handover process. Generally a handover process refers to a scenario in which a mobile network passes a wireless communication from one cell to another cell. A handover is generally a response to geographic movement by a mobile station from one cell to another. Two elements are generally involved in a handover: (1) handover decision, and (2) handover execution. The handover execution transition should be relatively seamless, providing no disruption to a communication and maintaining a high standard of call quality.

SUMMARY OF THE INVENTION

From the foregoing, it may be appreciated by those skilled in the art that a need has arisen for improved handover capabilities for a wireless communication. In accordance with one embodiment of the present invention, a system and method for handover execution in a wireless environment are provided, which substantially eliminates or reduces disadvantages and problems of conventional handover techniques.

According to one embodiment of the present invention, a method for handover execution in a wireless environment is provided that comprises communicating, by a mobile network, a handover command message to a physical layer of a mobile station to initiate a handover execution. The handover command message is received by the physical layer and the physical layer responds to the handover command message by tuning to a handed to frequency or channel and, where appropriate, by communicating physical layer bursts over the handed to frequency or channel to the mobile network such that initial timing advance and power control setting characteristics are determined by the mobile network.

The method also includes communicating a cease signal, by the mobile network, to the mobile station to stop communicating the physical layer bursts. The mobile station responds to the cease signal by ending the transmission of the physical layer bursts and by establishing a new communications link over the handed to frequency or channel with the mobile network. Once the new communications link is established the mobile station and the mobile network couple to a voice or a data path such that a wireless communication associated with the mobile station and the mobile network is facilitated.

Certain embodiments of the present invention provide a number of technical advantages. For example, according to one embodiment of the present invention, a handover execution is provided that includes a significantly lower handover execution time. The handover execution approach disclosed operates to transpose handover signaling from a Layer-3 radio resource management (RRM) level to a Layer-1 physical layer, allowing mobile stations to respond to handover commands more quickly. This in turn may result in increased handover quality, minimal call interruption time during a handover, reduced probability of dropping connections across handovers, and minimal handover latency. Additionally, by implementing a handover protocol that takes advantage of communications at a Layer-1 physical layer level, other delays in making an effective handover are minimized or otherwise avoided, thereby increasing the overall quality of communications in a wireless environment.

The embodiments, which follow, may enjoy some, all, or none of these advantages. Other technical advantages may be readily apparent to one skilled in the art from the following figures, the description, and the claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts in which.

DETAILED DESCRIPTION OF THE INVENTION

Figure 1:
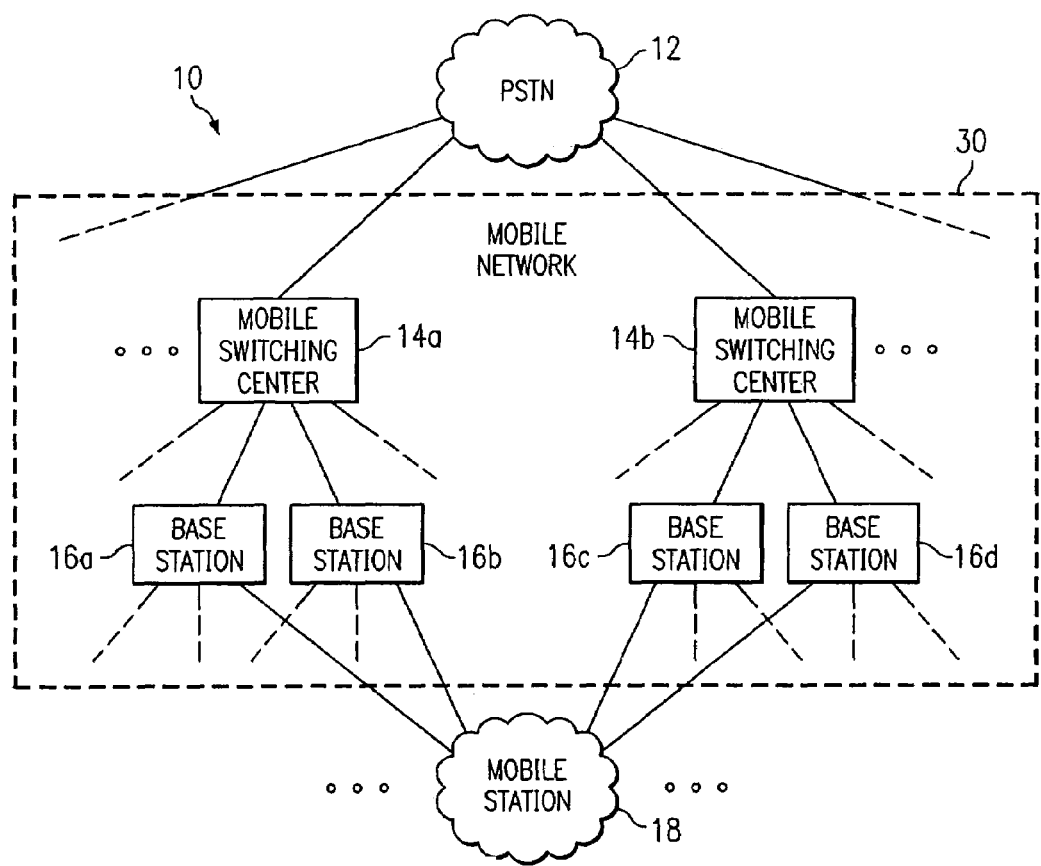
FIG. 1 is a block diagram of a wireless communication system in accordance with one embodiment of the present invention.

FIG. 1 is a block diagram of a wireless communication system 10 in accordance with one embodiment of the present invention. Wireless communication system 10 comprises a public switched telephone network (PSTN) 12, one or more mobile switching centers 14a and 14b, one or more base stations 16a, 16b, 16c, and 16d, and one or more mobile stations 18. Mobile switching centers 14a and 14b may operate in conjunction with base stations 16a–d to form or otherwise to define a mobile network 30, providing appropriate interfaces for mobile station 18 and PSTN 12 such that data may be exchanged in a wireless environment.

According to the teachings of the present invention, a handover execution approach is provided within wireless communication system 10 that minimizes the time expended in the internal messaging of the handover process. Wireless communication system 10 comprises mobile station 18 and mobile network 30 that are enhanced in order to effect a handover execution having increased speed and efficiency. This enhancement allows mobile station 18 to recognize a handover command from mobile network 30 at a Layer-1 physical layer level, as discussed in greater detail below. This approach results in a reduction in handover execution time by facilitating direct communications at a physical layer between mobile network 30 and mobile station 18. In order to provide a better understanding of the teachings of the present invention, a description of a general handover process is provided below.

A wireless communication may be occurring between mobile station 18 and PSTN 12 with the wireless communication being conducted or otherwise facilitated by mobile network 30. Mobile station 18 operates to communicate with base stations 16a–16d via an over-the-air radio interface. Mobile station 18 may be moving constantly through different cells, as an end-user or end-system moves about. Cells refer to the basic geographic unit of a wireless system. Generally, a city is divided into small cells, each of which are equipped with a low powered radio transmitter/receiver, i.e. base stations 16a–d. Cells can vary in size depending on terrain or capacity demands. The transition from one cell to the other is intended to be transparent to the end-user of mobile station 18. When mobile station 18 ventures into a new geographical area, a procedure may be initiated in order to effect continuation of the communication, preferably in the absence of call dropping or a reduction in call quality. To accomplish these ends, mobile station 18 and base stations 16a–d execute a handover (also referred to as a handoff). This generally involves seamlessly handing over mobile station 18 from one base station 16a to another base station 16b for example, as a user crosses a cell boundary. The handover procedure generally involves internal messaging between elements within wireless communication system 10. Additionally, a handover may also occur when mobile station 18 is in overlapping cells and the call quality, for example, triggers a handoff or handover from the current cell handling the wireless communication to the overlapping cell.

According to the teachings of the present invention, handover execution is enhanced by providing an increased capability or provision to mobile station 18 and any one of a number of elements within mobile network 30. This allows much of the internal messaging, as described in greater detail below, to be addressed at a Layer-1 physical layer level. Mobile station 18 comprises an element at the Layer-1 physical layer level that recognizes Layer-3 radio resource management (RRM) level messages, particularly those messages relating to a handover command. Because this recognition is specifically targeted to handover commands, the present invention may operate to significantly reduce handover time by allowing direct communication between mobile network 30 and mobile station 18 at a physical layer, resulting in increased call quality associated with the related wireless communications.

PSTN 12 represents a worldwide telephone system that is operable to conduct communications. PSTN 12 may be any land line telephone network operable to facilitate communications between two entities, such as two persons, a person and a computer, two computers, or in any other environment in which data is exchanged for purposes of communication. According to one embodiment of the present invention, PSTN 12 operates in a wireless domain, facilitating data exchange between mobile station 18 and some other entity.

Mobile switching centers 14a and 14b operate as interfaces between PSTN 12 and base stations 16a–d. Mobile switching centers 14a and 14b are generally locations that house communication switches and computers to which cell sites, in a given geographical area, are connected. Cell sites refer generally to the transmission and reception equipment or components, potentially including base stations 16a–d, that connect mobile station 18 to mobile network 30. In a given communications environment, there may be several mobile switching centers operable to facilitate communications between base stations 16a–d and PSTN 12. Mobile switching centers 14a and 14b also generally handle the connection, tracking, status, billing information, and other user information for wireless communications in a given area. This may include, for example, the fact that the user of mobile station 18 is assigned certain wireless capabilities or use time, most likely based on a given fee schedule associated with a cellular network.

Mobile switching centers 14a and 14b may be coupled to, supported by, or otherwise comprise a home location register (HLR) according to one embodiment of the present invention. The HLR represents a database of subscriber information relevant to telecommunication services, potentially independent of the actual location of the subscriber or end user. The HLR may also include information related to the current location of the subscriber for incoming call-routing purposes. A functional sub-division of the HLR may include an authentication center (AuC), the role of which may be the management of security data for the authentication of subscribers, for example.

Base stations 16a–d represent radio transmission and reception stations for handling communications traffic. Base stations 16a–d may also be identified as a cell site, primarily so because they may hold one or more transmit/receive cells. By controlling transmission power and radio frequencies, mobile switching centers 14a and 14b may monitor the movement and the transfers of a wireless communication from one cell to another cell and from one frequency or channel to another frequency or channel, where appropriate. Base stations 16a–d may comprise one or more receive/transmit antennas, generally referred to as base transceiver stations, a base station controller, a microwave dish, and associated electronic circuitry.

A base transceiver station is generally coupled to mobile station 18, via a radio interface, with a base station controller that uses a land line (usually a high speed T1/E1, for example) interface. A base transceiver station may comprise radio transmission/reception devices, components or objects, and antennas. A base transceiver station may operate as a series of complex radio modems and may assist in performing a handover execution process. The base transceiver station may also perform transcoding and rate adaptation functions, where appropriate, according to particular needs.

A base station controller generally operates as a management component for a radio interface. This may be done through remote commands to the base transceiver station within mobile network 30. One base station controller may manage more than one base transceiver station. Some of the responsibilities of the base station controller include management of radio channels and assisting in handover scenarios. Other communications objects or elements may be included within, external to, or coupled to base stations 16a–d or mobile network 30 including a visitor location register (VLR), for example, which contains dynamic information as well as copies of the HLR for mobile stations 18.

Mobile station 18 is a communications interface for an end user of wireless communication system 10. Mobile station 18 may be a cellular or other wireless telephone, a computer, a personal digital assistant (PDA), or any other device, component, or object capable of initiating a data exchange facilitated by wireless communication system 10. Apart from executing radio and processing functions to access mobile network 30 through a radio interface, mobile station 18 additionally offers an interface to the human user, such as via microphone, display, or keyboard or other terminal equipment (such as an interface to a personal computer, or a facsimile machine in cases where mobile station 18 is used as a modem, etc.) where appropriate. Mobile station 18 is generally a wireless communication station intended to be used when mobile station 18 is in motion from one geographical location to another. According to the teachings of the present invention, mobile station 18 comprises an element operable to recognize Layer-3 RRM messages, particularly recognizing handover commands from any one of a number of networking components within mobile network 30.

Mobile station 18 may achieve connectivity with another entity, regardless of where a user of mobile station 18 travels, via wireless communication system 10. At any given moment, mobile station 18 may be served by one of the cells, generally referred to as a serving cell of mobile station 18, which is dependent on where mobile station 18 is positioned at that time. As mobile station 18 moves away from its serving cell and into another cell, another cell takes over the responsibility of serving mobile station 18 and thus becomes the serving cell for mobile station 18. Such a service relay, needed for effective wireless communication, is achieved via mobile network 30 and one or more mobile stations 18.

Mobile station 18 comprises an element operable to identify Layer-3 RRM messages, recognizing handover commands from any one of a number of networking components within mobile network 30, such as a selected one of mobile switching centers 14*a* and 14*b*. During a handover process, the Layer-1 physical layer of mobile station 18 operates in parallel by communicating with both its own upper layers and with mobile network 30. According to the teachings of the present invention, this approach operates to shorten the response time to an initiated handover command. This process is explained in greater detail below with reference to FIG. 2.

Figure 2:
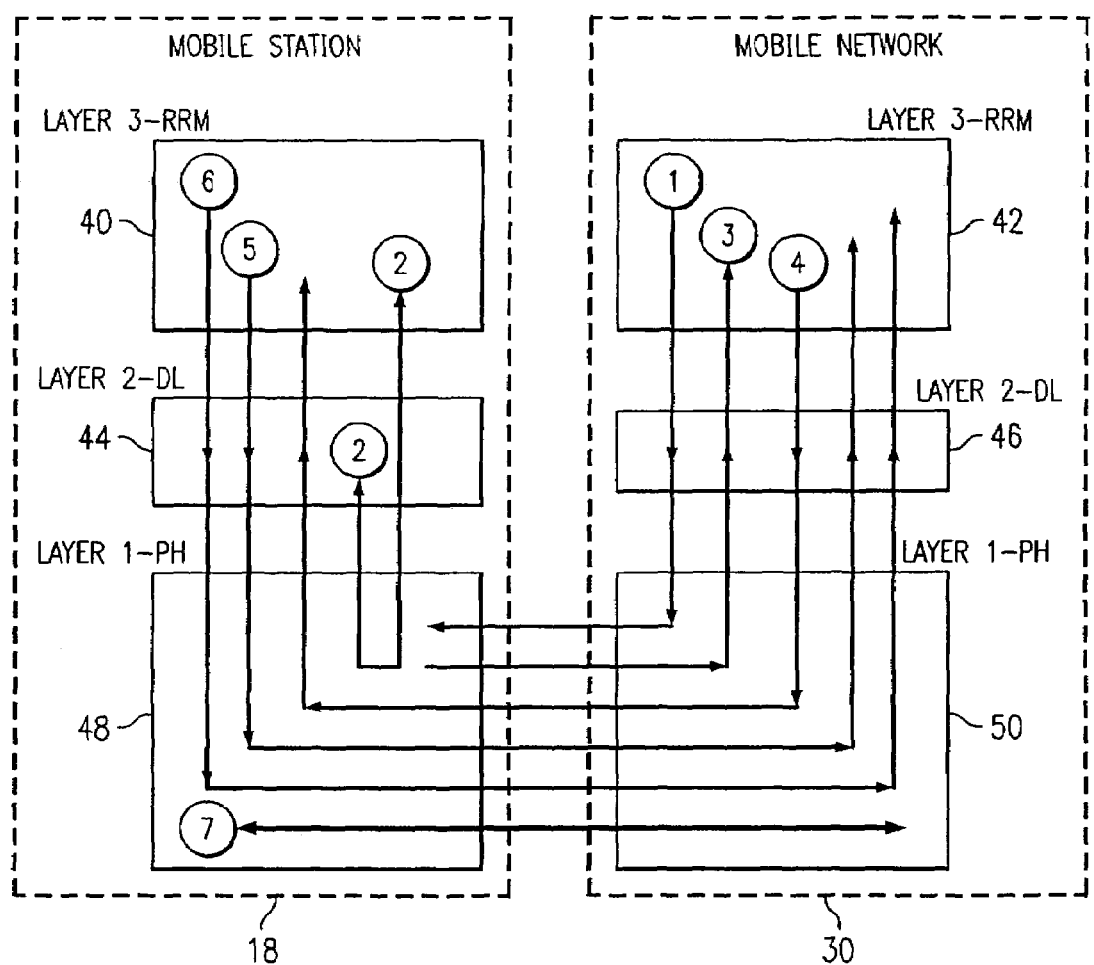
FIG. 2 is a block diagram of a wireless communication between a mobile station and a mobile network within the wireless communication system.

Turning to FIG. 2, FIG. 2 is a block diagram of a wireless communication between mobile station 18 and mobile network 30 that are included within wireless communication system 10, in accordance with one embodiment of the present invention. Mobile station 18 and mobile network 30 each comprise elements operable to facilitate handover execution in such a wireless communication. Mobile station 18 and mobile network 30 each include software that provides a protocol that addresses effective handover execution. Such software may alternatively be hardware or any other object, component, or element operable to facilitate handover execution in wireless communications system 10.

FIG. 2 also discloses a series of layers respectively contained within mobile station 18 and mobile network 30. Mobile station 18 and mobile network 30 each contain a Layer-3 RRM layer 40 and 42, a Layer-2 data link layer 44 and 46, and a Layer-1 physical layer 48 and 50. Each layer operates to handle part of the signaling tasks involved in a communication involving wireless communication system 10. In particular, Layer-1 physical layers 48 and 50 operate to transmit or receive bit streams to or from its peer physical layer and additionally operate to interface with their own internal Layer-2 data link layer and Layer-3 RRM layer.

Layer-2 data link layers 44 and 46 operate to move data across the physical links in communications between mobile station 18 and mobile network 30. Data messages are generally redirected at the Layer-2 level, using an address to determine where to direct the message. Layer-2 data link layers 44 and 46 may additionally operate to ensure that an initial connection has been set up, divide output data into data frames, and handle the acknowledgements from a receiver that the data arrived successfully. They may additionally ensure that incoming data has been received successfully by analyzing bit patterns in the frames. Layer-3 RRM layers 48 and 50 operate to initiate commands to be channeled through its associated Layer-2 data link layers and Layer-1 physical layers. Layer-3 RRM layers 48 and 50 may also operate as interfaces between mobile network 30 and mobile station 18 and other networking components.

FIG. 2 illustrates a series of numbers 1 through 7 that designate steps associated with the protocol that addresses handover execution. In general, a handover execution process at a side of mobile station 18 includes two stages: (1) suspension of signaling of a non-handover status, followed by tuning to a handed to frequency or channel; and (2) provided, there is successful completion of element (1), establishing a new Layer-2 data link layer over the handed to frequency or channel and then resuming the suspended signaling. In the situation where element (1) fails, the original frequency or channel is reverted to and the suspended signaling on the original frequency or channel is resumed. According to the teachings of the present invention, a handover approach is disclosed that transposes element (1) processing from a Layer-3 RRM layer to a Layer-1 physical layer, which may allow mobile station 18 to respond to a handover command message more quickly.

During steps 1 through 7, a communication, for example a phone call involving a cellular or wireless telephone at one end, continues such that an end user is unaware of the handover execution process that is being performed. This seamless characteristic is generally preferred, as suitable handovers may occur repeatedly without an end user's knowledge and moreover without causing a suspension in communications or without requiring an end user to participate in an initiated handover process.

At a first step (1) mobile network 30 initiates a handover execution process after a handover decision is made. This involves mobile network 30 passing a handover command message down through various layers associated with the internal structure of mobile network 30. The handover command message includes a handed to frequency or channel with which mobile station 18 tunes to continue communication in the new cell of mobile network 30. The message may also contain additional information relating to communications in the wireless domain, where appropriate. The message passes from Layer-3 RRM 42 to Layer-2 data link layer 46, and on to Layer-1 physical layer 50 of mobile network 30, which transmits the message to mobile station 18.

In response to the handover command message, at a second step (2), Layer-1 physical layer 48 of mobile station 18 sends a handover-command-message received indication to Layer-3 RRM 40 and Layer-2 data link layer 44 of mobile station 18 such that Layer-3 RRM 40 suspends its ongoing non-handover signaling. Additionally, at this point, Layer-2 data link layer 44 updates its internal state as if it had received frames containing the handover command message.

Simultaneously, at a third step (3) tunes to the handed to frequency or channel. Also at the third step (3), where appropriate mobile station 18 uses its Layer-1 physical layer 48 to begin transmitting physical layer bursts or packets to Layer-1 physical layer 50 of mobile network 30 such that mobile network 30 may calculate or otherwise determine the initial timing advance and the power control setting to be applied to mobile station 18. These physical layer bursts may also include other information or data relating to communications between mobile station 18 and mobile network 30, according to particular needs. Mobile network 30 receives the physical layer bursts and communicates this information to its internal Layer-3 RRM that uses them to calculate the initial timing advance and power control setting data.

At a fourth step (4), Layer-3 RRM 42 of mobile network 30 transmits a cease signal to mobile station 18, commanding mobile station 18 to stop transmission of the physical layer bursts it was sending. This message is received and recognized at Layer-1 physical layer 48 of mobile station 18. Layer-1 physical layer 48 responds to the cease signal by ending or otherwise truncating the transmission of physical layer bursts. The physical layer bursts are used by mobile network 30 in determining initial timing advance and power control setting data. In parallel to ceasing the transmission of physical layer bursts, mobile station 18 notifies Layer-3 RRM 40 that Layer-1 physical layer 48 has successfully tuned to the handed to frequency or channel and remains ready for an initiation for establishing a Layer-2 data link layer communication over the handed to frequency or channel.

Mobile station 18, at a fifth step (5) then commences in establishing a Layer-2 data link layer with mobile network 30. The Layer-2 data link layer connection represents a new communications link, i.e. the communications link between mobile station 18 and the handed to cell or target cell, that facilitates a communication involving mobile station 18 and mobile network 30. Mobile station 18 indicates the intention to establish such a link via an interlayer signaling primitive, such as DL_EST_REQ, for example. Mobile station 18 then begins to communicate with mobile network 30 at a Layer-2 data link layer via a physical layer connection between mobile station 18 and mobile network 30. Once the link is established, Layer-2 data link layer 46 of mobile network 30 notifies its Layer-3 RRM 42 of such a link, potentially via a similar interlayer signaling primitive, such as DL_EST_IND, for example.

Once the data link layer is established successfully between mobile station 18 and mobile network 30, at a sixth step (6), mobile station 18 then transmits another message indicating that the handover is complete to mobile network 30 such that Layer-3 RRM 42 of mobile network 30 is apprised of the status of the handover, i.e. that the handover is complete. Where appropriate, both mobile station 18 and mobile network 30 may then cut through to a new potential voice or data path involving mobile station 18, thus allowing both communication ends to seamlessly resume conversation at a seventh step (7).

Alternatively, before the fifth step (5), or in the case where the fifth step (5) fails to establish a data link over the handed to frequency or channel, at the sixth step (6) mobile station 18 may instead resume the original data link over the original frequency or channel and continue the suspended signaling in the case where the reversion succeeds.

Hence, according to the teachings of the present invention an improvement over current handover execution approach is provided that allows Layer-1 physical layer 48 of mobile station 18 to recognize handover commands, thereby eliminating the need to involve Layer-2 data link layer 44 and Layer-3 RRM layer 40 of mobile station 18 in multiple steps of the handover execution process in order to tune to the handed to frequency or channel.

Such a handover protocol, as disclosed above, may be particularly beneficial (because of its minimization of handover execution) in a voice call environment, for example. The present invention contemplates that wireless communication system 10 may be extended to shorten any frequency or channel change time needed during a communication involving mobile station 18 where mobile station 18 is positioned within one cell or involving many different cells. Examples involving such potential frequency or channel changes include intra-cell handover, direct retry, frequency reassignment, and tuning from a control channel to a first dedicated frequency, for example.

According to the teachings of the present invention, this handover execution approach may operate to significantly reduce time associated with the handover execution by removing the interlayer signaling exchange between a physical layer, a data link layer, and an RRM layer associated with mobile network 30 and mobile station 18. The present invention may be used in a host of communication environments, such as in conjunction with time division multiple access (TDMA), for example. In such an access scheme, users or multiple mobile stations 18 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel; N time slots make up a frame. In using TDMA it is possible to allocate different numbers of time slots per frame to different end users. Thus bandwidth can be supplied on demand to different users depending on user needs. The Global System for Mobile (GSM), and the IS-54/IS-136 based United States Digital Cellular (USDC) system are some of the standards that may use TDMA in conjunction with the present invention. The handover approach as discussed in FIGS. 1 and 2 may be implemented in a TDMA system in order to minimize handover execution time.

Frequency division multiple access (FDMA) represents another communications environment in which wireless communication system 10 may be employed. The FDMA system assigns individual frequency channels or bands to individual users wherein all users may transmit at the same time. These channels are assigned on demand to users requesting service. During the call no other user can share the same frequency band. An FDMA channel carries only one communications exchange, e.g. phone call at a time. After the assignment of a voice or data channel, mobile station 18 and base stations 16a–d transmit simultaneously and continuously. Mobile stations 16a–d that are used in conjunction with an FDMA system implement duplexers because both the transmitter and receiver operate at the same time. The Advanced Mobile Phone Service (AMPS) and the European Total Access Communication System (ETACS) are some of the standards that may use FDMA in conjunction with the handover approach of the present invention.

Code Division Multiple Access (CDMA) represents another environment in which wireless communication system 10 may be used in conjunction with the disclosed handover execution approach. All users in the CDMA system use the same carrier frequency and may transmit simultaneously. Each user has his own pseudo-random code word. Whenever mobile station 18 or base stations 16a–d using CDMA wish to transmit, the system may correlate the message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in shortening handover execution times. IS-95 may use the CDMA scheme in conjunction with the present invention.

Although the present invention has been described in detail with reference to particular embodiments illustrated in FIGS. 1 and 2, it should be understood that various other changes, substitutions, and alterations may be made hereto without departing from the spirit and scope of the present invention. For example, although the present invention has been described as operating in a PSTN environment, the present invention may be used in any communications environment where a handoff or a handover is suitable. The handover execution protocol disclosed in the preceding figures is generally applicable to all communication systems in which communication links are transferred from one unit to the next.

Additionally, although the present invention has been described with reference to communications between mobile station 18 and mobile network 3d, the protocol described for executing an efficient handover scheme may be implemented between any two components within a network. The present invention has merely described mobile station 18 and mobile network 30, which is inclusive of these elements that facilitate handover execution, for purposes of teaching the present invention and should not be construed to limit how or where this handover execution protocol is implemented. Moreover, the handover protocol, as disclosed above, may be implemented in any component, unit, hardware, software, object or element involved in the communications process.

Moreover, although the present invention is described with reference to a handed to frequency, the present invention contemplate applicability to a handed to channel, as is the case in CDMA systems and communications components. Thus, the term frequency is inclusive over channels or any other communications media where handover execution shortening is effected.

Numerous other changes, substitutions, variations, alterations, and modifications may be suggested to one skilled in the art and it is intended that the present invention encompass all such changes, substitutions, variations, alterations, and modifications as falling within the spirit and scope of the appended claims.

What is claimed is:

1. An apparatus for executing a handover in a wireless environment, comprising:
    a mobile station operable to receive and to recognize a handover command message at a physical layer of a mobile station for initiating a handover execution, the handover command message being communicated by a mobile network that is coupled to the mobile station, the physical layer of the mobile station responding to the handover command message by communicating with a data link layer and a radio resource management (RRM) layer of the mobile station such that the RRM layer suspends its non-handover signaling, by tuning to a handed to frequency, and by communicating physical layer bursts over the handed to frequency to the mobile network such that initial timing advance and power control setting characteristics are determined by the mobile network, wherein the physical layer corresponds to layer one communications, the data link layer corresponds to layer two communications, and the RRM layer corresponds to layer three communications, the mobile station is also operable to receive a cease signal that indicates to the mobile station to stop communicating the physical layer bursts, the mobile station operable to respond to the cease signal by ending a transmission of the physical layer bursts and to establish a new communications link over the handed to frequency with the mobile network, and wherein once the new communications link is established the mobile station and the mobile network can couple to a voice path such that a wireless communication associated with the mobile station and the mobile network is facilitated.

2. The apparatus of claim 1, wherein communicating the handover command message to initiate the handover execution to the physical layer comprises communicating the handover command message through a radio resource management (RRM) layer, a data link layer, and a physical layer associated with the mobile network.

3. The apparatus of claim 2, wherein the mobile station is further operable to update an internal state as if the mobile station had received one or more frames that included the handover command message that is communicated by the mobile network.

4. The apparatus of claim 3, wherein the update is executed by the data link layer of the mobile station.

5. The apparatus of claim 1, wherein the mobile station is further operable to complete a handover decision associated with the mobile station and the mobile network before the handover command message is communicated by the mobile network.

6. The apparatus of claim 1, wherein once the new communications link is established between the mobile station and the mobile network, the mobile station communicates a signal to the mobile network indicating completion of the handover execution.

7. The apparatus of claim 1, wherein the mobile station is further operable to indicate an intention to establish the new communications link via an interlayer signaling primitive.

8. The apparatus of claim 1, wherein once the new communications link is established the mobile station may cut through to the voice path or a new data path involving the mobile network.

9. The apparatus of claim 1, wherein if the new communications link is not established, the mobile station is operable to resume an original data link over an original frequency and continue suspended signaling.

10. An apparatus for executing a handover in a wireless environment, comprising:
    a mobile station operable to receive and to recognize a handover command message at a physical layer of a mobile station for initiating a handover execution, the handover command message being communicated by a mobile network that is coupled to the mobile station, the physical layer of the mobile station responding to the handover command message by communicating with a data link layer and a radio resource management (RRM) layer of the mobile station such that the RRM layer suspends its non-handover signaling, wherein the physical layer corresponds to layer one communications, the data link layer corresponds to layer two communications, and the RRM layer corresponds to layer three communications, wherein once a new communications link is established between the mobile station and the mobile network, the mobile station communicates a signal to the mobile network indicating completion of the handover execution, and wherein once the new communications link is established the mobile station may cut through to a new voice path or a new data path involving the mobile network.

11. The apparatus of claim 10, wherein the mobile station is further operable to respond to the handover command message by tuning to a handed to frequency, and by communicating physical layer bursts over the handed to frequency to the mobile network such that initial timing advance and power control setting characteristics are determined by the mobile network.

12. The apparatus of claim 11, wherein the mobile station is further operable to receive a cease signal that indicates to the mobile station to stop communicating the physical layer bursts, the mobile station operable to respond to the cease signal by ending a transmission of the physical layer bursts and to establish a new communications link over the handed to frequency with the mobile network.

13. The apparatus of claim 12, wherein once the new communications link is established the mobile station and the mobile network can couple to a voice path such that a wireless communication associated with the mobile station and the mobile network is facilitated.

14. The apparatus of claim 10, wherein the mobile station is further operable to update an internal state as if the mobile station had received one or more frames that included the handover command message that is communicated by the mobile network.

15. The apparatus of claim 14, wherein the update is executed by the data link layer of the mobile station.

16. The apparatus of claim 10, wherein the mobile station is further operable to complete a handover decision associated with the mobile station and the mobile network before the handover command message is communicated by the mobile network.

17. The apparatus of claim 10, wherein the mobile station is further operable to indicate an intention to establish the new communications link via an interlayer signaling primitive.

18. The apparatus of claim 10, wherein if the new communications link is not established, the mobile station is operable to resume an original data link over an original frequency and continue suspended signaling.

* * * * *